United States Patent [19]
Reynolds

[11] 3,825,335
[45] July 23, 1974

[54] VARIABLE COLOR PHOTOGRAPHIC LIGHTING SYSTEM
[75] Inventor: Robert Reynolds, Yuma, Ariz.
[73] Assignee: Polaroid Corporation, Cambridge, Mass.
[22] Filed: Jan. 4, 1973
[21] Appl. No.: 320,950

[52] U.S. Cl. .................. 355/1, 350/96 B, 355/37
[51] Int. Cl. ............................................ G03b 27/76
[58] Field of Search .............. 355/1, 35, 37; 350/96

[56] References Cited
UNITED STATES PATENTS
3,011,388   12/1961   Baumbach et al. ............... 355/35 X
3,043,179    7/1962   Dunn ................................. 355/1 X
3,536,908   10/1970   Oster ............................ 240/1 EL X Primary Examiner—Samuel S. Matthews
Assistant Examiner—Richard A. Wintercorn
Attorney, Agent, or Firm—John S. Vale

[57] ABSTRACT

A variable color lighting system for illuminating a scene to be photographed. The system features one or more fiber optic light mixing devices which receive light from a plurality of different colored light sources and additively mix the light to form light of a composite color. By varying the intensity of the different colors of light, the color of the composite light output may be varied such that it is compatible with particular photosensitive materials being used in the photographic process.

25 Claims, 4 Drawing Figures

PATENTED JUL 23 1974 3,825,335

VARIABLE COLOR PHOTOGRAPHIC LIGHTING SYSTEM

BACKGROUND OF THE INVENTION

1. Field of the Invention

The present invention relates to the field of photography and, more particularly, to a variable color lighting system for illuminating a scene to be photographed with color film.

2. Description of the Prior Art

Making copies of color positive prints on a commercial basis generally includes the steps of: photographing the positive print with a copy camera having color film therein; developing the color film to produce an internegative; placing the internegative in a printer or enlarger to project an image of the internegative onto positive print paper; and developing the exposed print paper to produce the final positive print.

It is well known in the photographic art that color film and positive print paper may vary from batch to batch in terms of color balance. Therefore, it is a common practice to test the film and paper combination for color balance prior to making the internegative and subsequent positive print. If color imbalance is detected, the lighting sources used in the above described process are adjusted to vary their color, or more precisely their color temperature, to compensate for the color imbalance.

For example, when the original positive print is photographed with the copy camera to produce the internegative, the print is illuminated with photoflood or studio lamps. Generally more than one lamp is used, and they are angled at the positive print to be reproduced to prevent unwanted reflection from the surface of the print. In order to match the color temperature of the light output from the lamps with the particular color film in the copy camera, compensating filters are placed in front of the lamps. Additional color compensation may be made during the printing stage by varying the color temperature of the light source used in the enlarger or printers.

The most common system for color balancing the light source used to illuminate the original positive print is to place one or more subtractive (yellow, cyan, and magneta) filters in front of each of the lamps. Major disadvantages of such a system are that the filters are costly, short-lived, and being incremental only permit step adjustments in color. More importantly, since each lamp being used to illuminate the original positive print must have its own filter or filter pack, it is extremely difficult to uniformly balance all of the lamps to the same color temperature.

As an illustration of the problems involved in providing uniform and color balanced illumination for photographing an original print, assume that the lighting system consists of two photoflood lamps positioned on either side of the copy camera. Each of the lamps is positioned to direct its light at a 45° angle relative to the print to eliminate glare and unwanted reflections from the surface of the print.

While it is desirable to match the light output and color temperature of each of the lamps as closely as possible, it is a very difficult task. The lamps tend to deteriorate with age and, therefore, they are difficult to match exactly in terms of light output and color temperature. The separate color packs used in front of each of the two lamps likewise tend to deteriorate with age. When selecting individual filters for each of the packs, it is extremely difficult to ensure that corresponding pairs of filters will be uniform. Also, because of the stepwise increments of the filters, making small adjustments in the color temperature of the light output is a time consuming and sometimes frustrating chore.

SUMMARY OF THE INVENTION

The present invention provides a simple and easy to use variable color lighting system for illuminating scenes to be photographed with color film. It is especially well suited for illuminating original positive prints to be copied with a copy camera to provide color internegatives.

The lighting system is an additive color system. That is, it combines sources of red, green, and blue light to form light of a composite color. For example, if equal intensities of red, green, and blue light are additively mixed, a neutral "white" light is produced. By increasing or decreasing the intensity of each of the three primary color light sources, the composite color may be varied.

In the preferred embodiment, the variable color lighting system includes independent sources of red, green, and blue light; means for independently varying the intensity of the red, green, and blue light; and one or more fiber optic light-mixing devices each having input ends for receiving the red, green, and blue light and a composite output end from which the three primary color lights are transmitted to intermix to form light of a composite color.

The composite output end of each of the fiber optic light-mixing devices is used as an individual light source for illuminating the scene or object to be photographed. For example, two such mixing devices may be employed positioning the composite output ends on either side of the copy camera for illuminating an original print. The input ends of both mixing devices are optically coupled to the same sources of red, green, and blue light. Since both mixing devices are fed from a common source, the composite color light output at the respective output ends is uniform. When the intensity of the primary light source is adjusted, the color temperature of the composite light at the output ends is changed simultaneously and in a uniform manner.

Each of the fiber optic mixing devices includes first, second, and third bundles of light transmitting optic fibers. Each of the three bundles has an input end and an output end. The input end of the first bundle is optically coupled to the source of red light for receiving and transmitting the light to its output end. The input ends of the second and third bundles are optically coupled, respectively, to the sources of green and blue light.

The output ends of the three bundles are integrated with one another to form the composite output end. More precisely, the individual fibers of the first, second, and third bundles are interwoven and systematically arranged to provide an ordered array of fiber ends alternatively selecting fibers from each of the three bundles. In this manner, a mosaic or reseau is formed at the composite output end having an even distribution of fiber ends from each of the three bundles.

As the red, green, and blue light is transmitted from the reseau, it intermixes to form light of a composite color. In a preferred embodiment, the individual fibers in each of the first, second, and third bundles are randomly arranged therein such that light is transmitted from the input ends of the bundles to the reseau at the composite output end in an incoherent manner. This type of structure is utilized to prevent an image of a hot lamp filament from being transmitted along the fiber bundle in a coherent manner. Since the filaments tend to develop hot spots, scrambling of the image ensures a more even distribution of light at the reseau.

The number of individual fiber optic light-mixing devices in the variable color lighting system of the instant invention will depend on the number of locations from which it is desired to direct light at the scene or object being photographed. Regardless of the number of individual mixing devices, the variable color lighting system is characterized by the fact that all of the individual mixing devices are receiving light from common sources. In a three color additive system, utilizing red, green and blue light sources, all of the individual light mixing devices receive substantially equal amounts of red, blue, and green light. Thus if the intensity of the red light sources decreased, all of the fiber optic mixing devices receive equal decreases of red light at the respective input ends.

Therefore, it is an object of the present invention to provide a variable color lighting system for illuminating a scene or object to be photographed with color film, said system including a plurality of sources of different color light, means for independently varying the intensity of each of the different colors of light, and means for receiving and combining the light of different colors to form light of a composite color and for directing a light of a composite color towards the object or scene to be photographed, preferably from at least two different locations.

It is yet another object of the present invention to provide such a variable color lighting system wherein the receiving, combining and directing means includes at least two fiber optic light-mixing devices.

It is another object of the present invention to provide a variable color lighting system comprising a plurality of devices for directing light towards a scene to be photographed from different locations, all of said devices being fed from a commom source providing light of at least two different colors.

Still another object of the present invention is to provide a variable color lighting system including independent sources of red, green, and blue light, means for varying the intensity of the red, green, and blue light, and at least two fiber optic light-mixing devices each comprising first, second, and third bundles of individual light transmitting fibers, each of said bundles having an input end and an output end, said input ends of said first, second, and third bundles being optically coupled, respectively, to said sources of red, green, and blue light, and the output ends of said first, second, and third bundle being systemmatically interwoven to form an ordered array of fibers whereby the red, green and blue light is intermixed to form light of a composite color when transmitted from said ordered array.

Another object of the invention is to provide a system for illuminating a scene to be photographed.

Other objects of the invention will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFEREED EMBODIMENT

Figure 1:
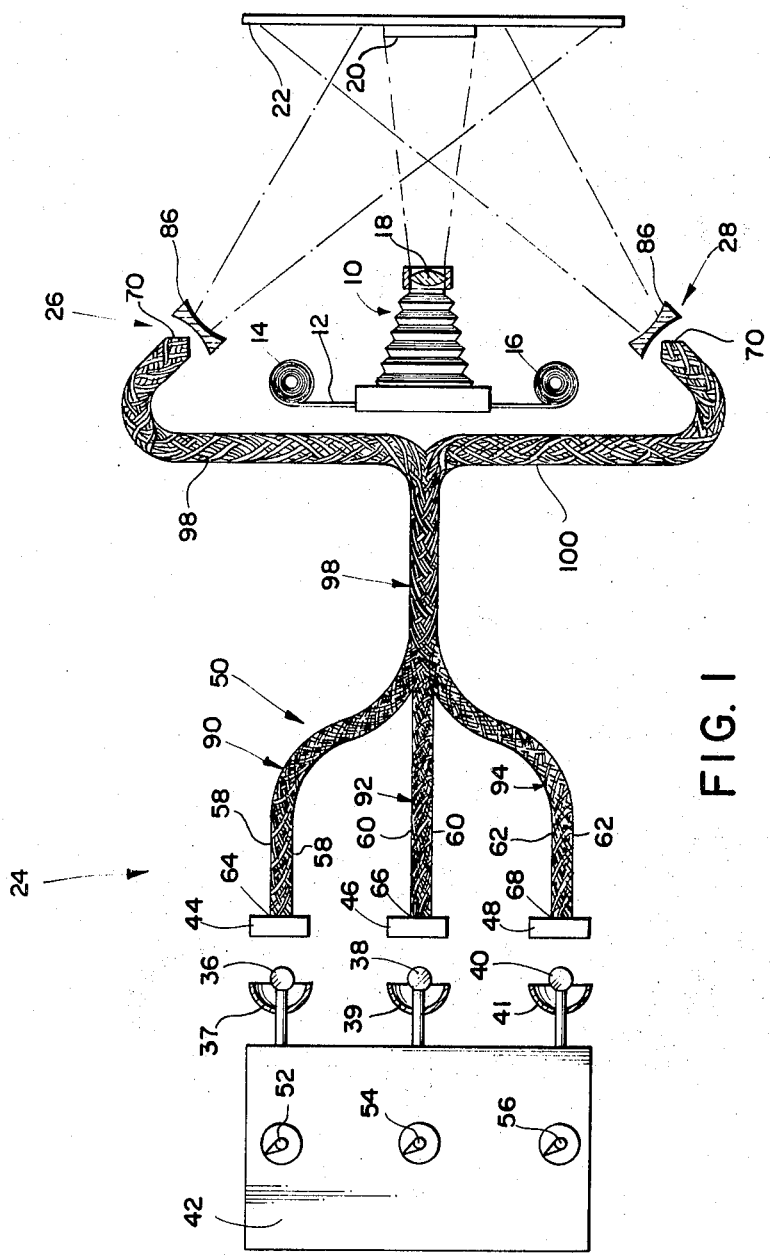
FIG. 1 is a diagrammatic representation of a system for making copies of an original positive print showing a copy camera positioned to photograph the print and a variable color lighting system directing light of a composite color at the print from two locations on opposite sides of the copy camera.

FIG. 1 is a diagrammatic representation of a system for photographing a color print to produce a color inter-negative. The system includes a conventional copy camera 10 which is loaded with a roll of color film 12 coupled between a supply reel 14 and a take-up reel 16. Camera 10 includes an objective lens 18 which is focused on a positive print 20 supported on a print support member 22.

The print 20 is illuminated by a variable color lighting system 24 which is configured to direct light onto the print 20 from locations 26 and 28 on opposite sides of copy camera 10. As noted earlier, the lighting system 24 is configured to direct light rays at an oblique angle to the front surface of print 20 rather than directly at the front surface to prevent the light rays from being reflected from the surface of the print directly into the objective lens 18.

The above brief description of the print copying system is provided to illustrate a typical operating environment for the variable color lighting system 24. It will be understood that the scope of the present invention goes beyond the bounds of the described system in that the lighting system 24 may be used with other types of copying systems and in non-copying photographic situations. That is to say, the lighting system 24 may be utilized to illuminate any type of scene or object.

The variable color lighting system 24 comprises: three tungsten lamps 36, 38 and 40, each having its own parabolic focusing reflector (37, 39 and 41, respectively) associated therewith; a three channel power supply 42 connected to the lamps 36, 38 and 40 for individually powering and varying the intensity of each of the lamps 36, 38 and 40; red, green, and blue filters 44, 46 and 48 positioned, respectively, in front of lamps 36, 38 and 40; and a fiber optic light mixing system 50 optically coupled to the three primary color filters 44, 46 and 48 for combining the red, green and blue light to form light of a composite color and for directing the composite color light onto the print 20 from locations 26 and 28. The fiber optic light mixing system 50 is formed by two separate light mixing devices 57 and 59 (shown in FIG. 4) that will be described in detail hereinafter. In a preferred embodiment, the power supply 42 is of the constant voltage type to counteract any fluctuations in the line voltage feeding it. It is preferably divided into three separate channels for independently powering each of the three lamps 36, 38 and 40. Each power channel is provided with a control member, for varying the power input to each of the lamps, preferably by varying the voltage input thereto. In FIG. 1, the individual control members are represented as knobs or dials. Knob 52 regulates the voltage input to lamp 38, and knobs 54 and 56 are used to control lamps 38 and 40, respectively.

The red filter 44, positioned in front of lamp 36 and reflector 37, transmits red light and absorbs all the other colors in the spectrum emitted from the tungsten lamp 36. Thus, filter 44, lamp 36, reflector 37, and a portion of power supply 42 may be considered to be "a source of red light" for the purposes of this disclosure. Knob 52 is representative of a portion of the power supply that is used to regulate or vary intensity of the "source of red light" by changing the power input or voltage to lamp 36. The same definition applies to the other lamps, filters, and control knobs. Thus, the variable color lighting system 24 is to be considered as including a source of red light, a source of green light, a source of blue light, and means connected to these sources of colored light for independently varying their respective intensities. It is to be understood, that it is within the scope of the instant invention to employ other sources of red, green, and blue light such as providing appropriately colored lamps and dispensing with the filters.

The light outputs of the red, green, and blue sources are fed into an input end of the fiber optic mixing system 50 and are additively mixed as they emerge from the two output ends (at locations 26 and 28) to form light of a composite color. When the red, green and blue light outputs are substantially of equal strength, the composite color is "white." One may think in terms of "white" light as being a balanced light with no one primary color being dominant.

Figure 4:
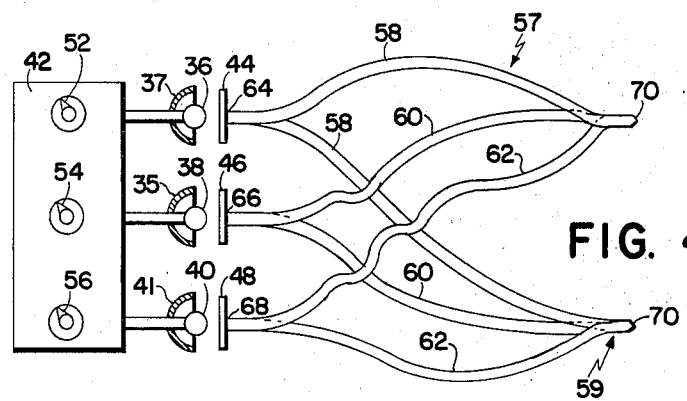
FIG. 4 is a diagrammatic representation of two fiber optic light mixing devices forming part of the variable color lighting system.

As noted earlier, the fiber optic light mixing system comprises two separate light mixing devices. As best shown in FIG. 4, a first light mixing device 57 emits light from location 26 and a second light mixing device 59 emits light from location 28. Since the light mixing devices 57 and 59 are identical in all respects, the structural details of only one of the devices (57) will be described. Fiber optic mixing device 57 preferably comprises three separate incoherent bundles 58, 60 and 62 of individual light transmitting optic fibers. The input end 64 of bundle 58 is optically coupled to the source of red light to receive its light output and transmit the light output along its length in an incoherent manner with a minimum of light loss. Similarly, the input end 66 of bundle 60 and the input end 68 of bundle 62 are optically coupled to the green and blue light sources.

The opposite ends, or output ends, of the fiber optic bundles are integrated with one another (or more precisely, interwoven in a manner to be described hereinafter) to form a composite output end 70 of light mixing device 57.

Each of the incoherent bundles 58, 60 and 62 is formed by a plurality of individual, flexible, light-transmitting optic fibers, each of which has an input end and an output end. Each of the flexible fibers is formed by an inner core having a first index of refraction and an outer sheath, covering the core, and having a second index of refraction which is lower than the first index of refraction. The interface between the sheath and the core provides an environment for highly efficient light transmission along the length of the fiber by multiple internal reflections. Since the light is substantially totally internally reflected, the fiber may be bent or curved without light loss.

The fibers may be made of coated glass or coated plastic. The glass fibers are more suitable for high temperature applications but are less flexible than the plastic fibers. Experience has shown that plastic fibers may be used in the mixing devices 57 and 59.

The three bundles 58, 60 and 62 are incoherent in nature. That is to say, they are formed by a plurality of individual fibers that are intermixed along their length in a random fashion to form the bundle.

This is in contrast to a coherent bundle wherein the fibers are laid up in systematic parallel fashion so that an end of an individual fiber at the input end of the bundle occupies the same relative position to the fiber ends around it at the output end. Coherent fiber bundles are used for image transmission applications where it is desirous to maintain the coherency of the image from the input end of the fiber bundle to its output end. In the instant application, the input ends of the fiber optic bundles 58, 60 and 62 "look at" the glowing filaments of lamps 36, 38, and 40 through the filters 44, 46 and 48. Lamp filaments tend to develop "hot spots" with age. That is, the light output tends to become non-uniform along the length of the filament. If coherent fiber optic bundles were employed, the non-uniform light output would be transmitted along the light mixing device and provide a non-uniform distribution of light at the composite output end 70.

By employing incoherent bundles of fiber optics, the image of the filament is scrambled as it is transmitted along each bundle and therefore, the light output from the end of the bundle is more even in its distribution.

While the individual fibers forming the incoherent bundles 58, 60 and 62 are randomly arranged within each bundle, they are interwoven together at their respective output ends in a systematic manner to provide an ordered distribution of fibers carrying red, green and blue light.

Figure 2:
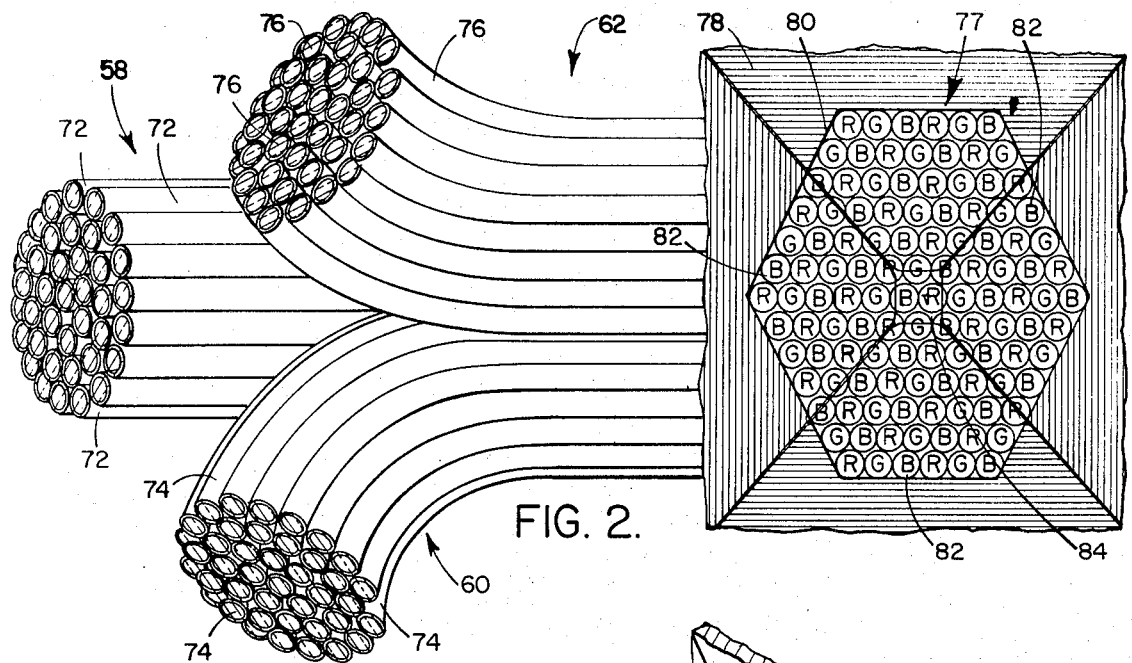
FIG. 2 is a perspective view of a composite output end of a fiber optic mixing device showing the systematic arrangement of interwoven optic fibers from three bundles of fibers forming the mixing device.

Referring now to FIGS. 2 and 4 of the drawings, the three incoherent bundles 58, 60 and 62 are integrated with one another at their respective output ends to form the composite output end 70 of mixing device 57. For the sake of clarity, the individual optic fibers forming bundle 58 will be designated as fibers 72. The optic fibers in bundles 60 and 62 will be designated 74 and 76. The individual fibers of the three bundles are arranged in a systematic order to form a mosaic or reseau 77 at composite output end 70. In a preferred embodiment, the reseau 77 is hexagonal in cross-section but may take other shapes, e.g., a circle, square, triangle, rectangle, or other shape as may be desired or needed. In the illustrated embodiment, a metal or plastic collar 78, having a hexagonal opening 80 therein, is used to facilitate the laying up of the systematic reseau and for holding the fibers in a close packed relationship.

Starting at the upper left hand corner of the reseau 77, a first row of fibers is established by alternating fibers from each of the three fiber optic bundles. The first row of the reseau 77 beings with a fiber 72. It is followed with a fiber 74 which is followed by fiber 76. This same pattern is repeated to complete the first row.

The second row of the reseau 77 is substantially parallel to the first row, but because of the circular cross-section of the ends of the individual fibers 72, 74 and 76, the fibers of the second row are interdigitated with respect to the fibers of the first row to achieve maximum packing density. From left to right, the sequence of fibers is 74, 76, 72, 74, 76, 72, and 74. The third row is substantially parallel to the first and second rows and its fibers are in turn interdigitated with those of the second row. The fiber sequence of the third row, from left to right, is 76, 72, 74, 76, 72, 74, 76, and 72. The next 10 rows of the reseau 77 are formed by repeating the pattern established in the first three rows. For the ease of illustration, the output ends of the individual fibers 72, 74 and 76 carry the designation R, G and B, respectively, to indicate that fibers 72 carry red light to the end of the reseau while fibers 74 and 76 carry green and blue light, respectively.

It will be noted that the reseau 77 is made up of a repeating pattern of triangular clusters of fibers, each of which includes red, green, and blue light-transmitting fibers 72, 74 and 76. For example, one triangular cluster is formed by the first fiber 72 in the first row and the first and second fibers, 74 and 76, in the second row. Another triangular cluster is formed by the first two fibers, 72 and 74, in the first row and the second fiber, 76, in the second row. Thus, substantially an equal number of fibers 72, 74 and 76 are used to form the reseau 77 and they are evenly distributed within the reseau 77.

Figure 3:
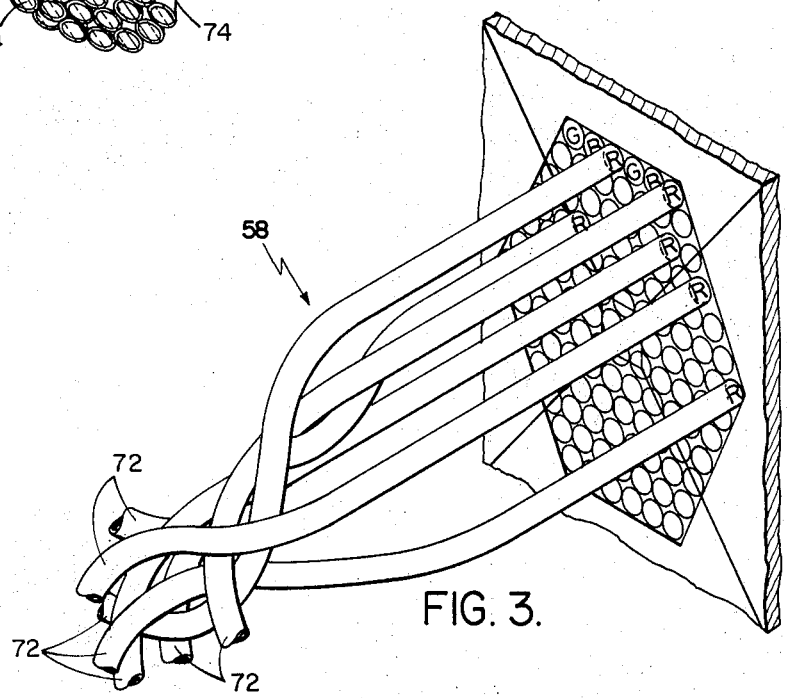
FIG. 3 is a perspective view of the composite output end of the mixing device showing the incoherent nature of one of the three fiber optic bundles.

FIG. 3 shows a rear view of the reseau 77 and representative fibers 72 of incoherent bundle 58 only. This is to illustrate the incoherent nature of bundle 58. It will be noted that the individual fibers 72 are randomly interwoven along their length before they reach reseau 77. As noted previously, this type of bundle structure prevents a coherent image of the filament of lamp 36 from being transmitted to the output end 70 which may lead to an uneven distribution of red light at the reseau, thereby causing uneven illumination of the print 20 supported on support member 22.

The mixing of the red, green, and blue light does not occur within mixing device 57 but rather at a point slightly beyond the composite output end 70. The red, green, and blue light emerges from the output end and propagates in expanding cones of light radiating outwardly about a longitudinal transmission axis of device 57. Because of the close packed density of the fibers, the adjacent red, green, and blue cones of light overlap at a very short distance from composite output end 70 where they additively mix to form light of a composite color.

The composite color light also propagates from the output end 70 in an expanding cone of light. Assume for the moment that the output ends of the individual fibers 72, 74, and 76 forming the reseau 77 terminate in a common plane so that the output end 70 of mixing device 57 is substantially flat. The cone of composite light will then subtend a solid angle which is mainly a function of the diameters of the individual fibers 72, 74 and 76. Fine diameter fibers will generate a relatively small solid angle while coarser fibers will generate a larger solid angle. By increasing the number of fibers 72, 74 and 76 forming the reseau 77, the solid angle is increased slightly, but for the most part it is defined by fiber size not number. The number of individual fibers in the reseau (assuming that they all transmit substantially the same amount of light) will determine the intensity of the composite light at any given distance from the composite output end 70.

In some instance, the cone of light emanating from the composite output end 70 of a mixing device 57 having a planar reseau 77 may be too small to completely illuminate the print 20.

One solution to this problem is to shape the composite output end 70 such that it disperses or bends the light rays transmitted therefrom outwardly from the longitudinal transmission axis. As best shown in FIG. 2, the composite output end 70 is suitably ground and polished such that it includes four substantially triangular shaped facets 82. The reseau, rather than being disposed in a single plane which is normal to the longitudinal transmission axis, now exhibits a pyramidal shape, having its apex 84 at the leading edge of end 70, with all but a few individual fibers at the center being disposed on the four inclined facets 82.

The number of facets and their angle relative to the transmission axis may be varied depending upon the degree of dispersion required. Optically, each of the facets acts as a prism mounted on the end of the combined fiber optic bundle and provides, by its shape, the means for bending the light rays emerging from the composite output end 70 to increase the solid angle subtended by the cone of composite light.

Another method for increasing the solid angle or "field of illumination" is to employ an appropriate negative dispersing lens 86 in front of the reseau 77. As shown in FIG. 1, even greater light dispersion may be achieved by combining both methods. The faceted output end 70 of the mixing device 57 directs the composite light output to a negative lens 86 positioned at location 26 in alignment with output end 70. Lens 86 further expands the "field of illumination" to completely illuminate the print 20.

The second fiber optic light mixing device 59 is identical in construction to light mixing device 57. It also comprises first, second and third bundles (58, 60, and 62) of individual light-transmitting optic fibers. These three bundles have their input ends 64, 66 and 68 optically coupled (respectively) to the sources of red, green, and blue light and their output ends integrated with one another to form the order of array or reseau 77 at a composite output end 70.

It will be understood, that the fiber optic light mixing system 50, shown in FIG. 1, is comprised of the two fiber optic light mixing devices 57 and 59 shown in FIG. 4. In FIG. 1, an input section 90 of fiber optic system 50 is optically coupled to the source of red light and is made up of two fiber optic bundles 58, one from each of the light mixing devices 57 and 59. An input section 92, coupled to the green light source, comprises two bundles 60 and an input section 94, coupled to the blue source comprises two fiber optic bundles 62. A mid-section 96 of fiber optic light mixing system 50 includes all six bundles. A first output section 98 includes the first, second and third fiber optic bundles 58, 60 and 62 of light mixing device 57, and a second output section 100 includes the first, second and third bundles 58, 60, and 62 of light mixing device 59.

In a preferred embodiment, the individual fibers of the two similar optic bundles optically coupled to one of the filters are interwoven to insure equal light transmission into each of the fiber optic light mixing devices 57 and 59.

In operation, the negative and positive material is tested for color balance. Based on the test results, an appropriate color temperature for the lighting system 24 may be selected. The intensities of the red, green, and blue light sources are individually adjusted to produce light of the desired composite color. It will be noted that as one lamp is decreased in intensity, the other two lamps may have to be increased in intensity to maintain a predetermined level of total light output from the two composite ends 70.

A major advantage of the variable color lighting system 24 is that the composite color of light being transmitted from the first and second composite ends 70 is exactly the same because both of the light mixing devices 57 and 59 are being fed from a common source.

The illustrated embodiment of fiber optic light mixing system 50 has been shown to include a first light mixing device 57 in combination with a second light mixing device 59. It will be understood that more than two light mixing devices may be employed in such a system. For example, a third light mixing device, or even a fourth light mixing device, may be added to the system to direct light onto print 20 from other locations around copy camera 10. In addition to increasing the number of individual light mixing devices in the system, the structural features of each device may be changed. In my copening application Ser. No. 320,951 filed concurrently herewith, I have described fiber optic light mixing devices which additively combine light from two independent sources and four independent sources, as well as devices that combine red, green, and blue light.

It will also be noted that a single fiber optic light mixing device may be employed for directing light towards a scene or object from a single location without producing unwanted reflections or undesirable shadows. For example, the composite output end of the device may be configured in the shape of a ring that surrounds the objective lens of the copy camera. In another embodiment, the composite output end may take the form of an elongated rectangle positioned horizontally above or below the optic axis of the camera.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A variable color lighting system for illuminating a scene to be photographed, said variable color lighting system comprising:

means for receiving a plurality of light sources each of said sources providing light of a different color;

means for independently varying the intensity of said different color light provided by each of said plurality of light sources; and a fiber optic light mixing system for receiving and combining said different color light to provide light of a composite color representing an additive mixture of independent intensities of said different color light and for directing said light of a composite color from at least two separate locations towards a scene to be photographed.

2. A variable color lighting system as defined in claim 1 wherein said fiber optic light mixing system includes at least two fiber optic light mixing devices, the number of said fiber optic light mixing devices being equal to the number of said separate locations from which said composite color light is to be directed towards the scene.

3. A variable color lighting system as defined in claim 2 wherein each of said fiber optic light mixing devices has a plurality of input ends, each of said input ends being optically coupled to a different one of said plurality of light sources, and a single composite output end adapted to be positioned at one of said separate locations for directing light of said composite color towards the scene to be photographed.

4. A variable color lighting system as defined in claim 1 wherein said fiber optic light mixing system includes a plurality of fiber optic light mixing devices, the number of said fiber optic light mixing devices being equal to the number of said separate locations from which light of said composite color is directed towards the scene, each of said plurality of fiber optic light mixing devices including a plurality of bundles of individual light transmitting optic fibers, the number of said bundles being equal to the number of said plurality of light sources, each of said plurality of bundles having an input end and an output end, said input ends of each of said plurality of bundles being optically coupled, respectively, to a different one of said plurality of light sources for receiving said light of different colors for transmission through said bundles to their respective output ends, said output ends of said plurality of bundles being integrated with one another to form a composite output end of said fiber optic light mixing device, said individual optic fibers of said plurality of bundles being systematically interwoven to form an ordered array of fibers, selected alternatively from each of said plurality of bundles, such that said light of different colors intermixes to form light of a composite color for illuminating the scene to be photographed when transmitted from said composite output end, and each of said plurality of bundles having its individual optic fibers arranged randomly therein for transmitting the light received at said output ends to said composite output end in an incoherent manner.

5. A variable color lighting system as defined in claim 4 wherein said plurality of individual light sources includes a source of red light, a source of green light, and a source of blue light and each of said plurality of fiber optic light mixing devices includes first, second, and third bundles of optic fibers having their respective input ends optically coupled, respectively, to said sources of red, green, and blue light.

6. A variable color lighting system as defined in claim 4 wherein said individual fibers of said plurality of bundles are systematically arranged at said composite output end in parallel, adjacent, interdigitated rows, each of said rows having a repeating sequence of fibers selected alternatively from said individual fibers of said plurality of bundles and said adjacent rows being configured to provide a repeating array of clusters of fibers at said composite output end, each of said clusters including one fiber from each of said plurality of bundles.

7. A variable color lighting system as defined in claim 4 wherein each of said light mixing devices includes a longitudinal light transmission axis and said ordered array of fibers at said composite output end is configured to include at least one surface which is inclined with respect to said light transmission axis for directing light of a composite color outwardly from said light transmission axis.

8. A variable color lighting system as defined in claim 1 wherein said plurality of light sources includes a source of red light, a source of green light, and a source of blue light.

9. A variable color light system as defined in claim 1 wherein said means for receiving a plurality of light sources includes means for receiving a plurality of electrically powered lamps.

10. A variable color lighting system as defined in claim 9 wherein said means for varying the intensities of said plurality of light sources includes means for independently varying the electrical power input to each of said lamps.

11. A variable color lighting system as defined in claim 10 wherein said means for independently varying the electrical power input includes means for varying the voltage input to each of said lamps.

12. A variable color lighting system as defined in claim 9 wherein said means for receiving a plurality of light sources includes means for receiving a plurality of filters, each of said filters being configured to transmit light of a different color, each of said filters being adapted to be positioned between one of said plurality of lamps and said light receiving, combining and directing means.

13. A fiber optic light mixing system for receiving and combining light from a plurality of independent light sources, each providing light of a different color and being capable of having the intensity of its light output varied independently from the light output of the other light sources, to form light of a composite color and for directing light of said composite color towards a scene or object from at least two separate locations, said fiber optic light mixing system comprising:

a plurality of individual fiber optic light mixing devices, the number of said fiber optic light mixing devices being equal to the number of independent light sources;

each of said fiber optic light mixing devices including;

a plurality of bundles of individual light transmitting optic fibers, the number of incoherent bundles being equal to the number of the plurality of light sources, each of said bundles having an input end and an output end, said input ends of each of said plurality of bundles being adapted to be optically coupled, respectively, to one of the plurality of light sources for receiving different colored light for transmission through said plurality of bundles to their respective output ends;

said output ends of said plurality of bundles being integrated with one another to form a composite output end of said fiber optic light-mixing device, said individual optic fibers of said plurality of bundles being systematically interwoven to form an ordered array of fibers, selected alternatively from each of said plurality of bundles, such that the light of different colors intermixes when transmitted from said composite output end to form light of a composite color, each of said composite output ends of said fiber optic light mixing devices being positioned at one of said locations from which light of a composite color is to be directed towards the scene or object to be illuminated.

14. A fiber optic light mixing system as defined in claim 13 wherein each of said plurality of bundles has its individual fibers arranged randomly therein such that light received at said input end is transmitted to said ordered array at said composite output end in an incoherent manner.

15. A fiber optic light mixing system as defined in claim 13 wherein the plurality of independent light sources includes a source of red light, a source of green light and a source of blue light, and each of said plurality of fiber optic light mixing devices includes first, second and third bundles of optic fibers having their respective input ends optically coupled, respectively, to the sources of red, green, and blue light.

16. A fiber optic light mixing system as defined in claim 15 wherein said individual fibers of said plurality of bundles are systematically arranged at said composite output ends of said plurality of light-mixing devices in parallel, adjacent, interdigitated rows, each of said rows having a repeating sequence of fibers selected alternatively from said individual fibers of said plurality of bundles, said adjacent rows being configured to provide a repeating array of clusters of fibers at said composite output end, each of said clusters including one fiber from each of said plurality of bundles.

17. A fiber optic light mixing system as defined in claim 14 wherein each of said light-mixing devices includes a longitudinal light transmission axis and said ordered array at said composite output end is configured to include at least one surface which is inclined with respect to said light transmission axis for directing light of a composite color outwardly from said light transmission axis.

18. A photographic system for illuminating and photographing a positive print, said system comprising:

means for supporting a positive print;

a copy camera located at a position for photographing a print supported by said print support means; and a variable color lighting system for directing light from at least two separate locations to illuminate a print supported by said print support means, said variable color lighting system including:

means for receiving a plurality of independent light sources, each of said sources providing light of a different color;

means for independently varying the intensity of said different colored light provided by each of said plurality of light sources; and a fiber optic light mixing system for receiving and combining said different colored light to provide light of a composite color representing an additive mixture of independent intensities of said different colored light and for directing said light of a composite color towards a print supported by said print support means from at least two separate locations.

19. A photographic system as defined in claim 18 wherein said fiber optic mixing system comprises a plurality of fiber optic light mixing devices, the number of fiber optic light mixing devices being equal to the number of separate locations from which said light of a composite color is directed towards a print supported by said print support means.

20. A photographic system as defined in claim 19 wherein each of said plurality of fiber optic light mixing devices includes a plurality of bundles of individual light transmitting optic fibers, the number of said bundles being equal to the number of said plurality of light sources, each of said bundles having an input end and an output end, said input ends of each of said plurality of bundles being optically coupled, respectively, to a different one of said plurality of light sources for receiving light of said different colors for transmission through said bundles to their respective output ends, said output ends of said plurality of bundles being integrated with one another to form a composite output end of said light receiving, combining, and directing means, said individual optic fibers of said plurality of bundles being systematically interwoven to form an ordered array of fibers, selected alternatively from each of said plurality of bundles, such that said light of different colors intermixes to form light of a composite color, for illuminating a print, when transmitted from said composite output end.

21. A photographic system as defined in claim 20 wherein said composite output end has a longitudinal light transmission axis and said ordered array included at least one surface that is inclined with respect to said light transmission axis for directing light of a composite color outwardly from said light transmission axis.

22. A photographic system as defined in claim 20 further including a negative lens positioned in front of each of said composite output ends for dispersing said light of a composite color transmitted from said composite output ends.

23. A photographic system as defined in claim 20 wherein said means for receiving a plurality of light sources includes means for receiving sources of red, green, and blue light and each of said fiber optic light mixing devices includes first, second and third bundles of optic fibers having their input ends optically coupled, respectively, to said sources of red, green and blue light.

24. A photographic system as defined in claim 20 where each of said bundles of optic fibers has its individual optic fibers arranged randomly therein such that light received at said input end is transmitted to said ordered array in an incoherent manner.

25. A photographic system as defined in claim 18 wherein said means for receiving a plurality of light sources includes means for receiving sources of red, green and blue light.

* * * * *